(12) United States Patent
Haberstroh et al.

(10) Patent No.: US 8,313,329 B2
(45) Date of Patent: Nov. 20, 2012

(54) SKETCHING DEVICES HAVING IMPROVED GEOMETRY

(76) Inventors: Charles Haberstroh, San Diego, CA (US); Martin P. Haberstroh, San Diego, CA (US)

( * ) Notice: Subject to any disclaimer, the term of this patent is extended or adjusted under 35 U.S.C. 154(b) by 205 days.

(21) Appl. No.: 12/875,610

(22) Filed: Sep. 3, 2010

(65) Prior Publication Data
US 2012/0058454 A1 Mar. 8, 2012

(51) Int. Cl.
*G09B 11/00* (2006.01)
(52) U.S. Cl. .......................................... 434/85
(58) Field of Classification Search .................... 434/81, 434/85, 87, 88, 261, 162, 163, 164
See application file for complete search history.

(56) References Cited

U.S. PATENT DOCUMENTS

| | | | | |
|---|---|---|---|---|
| 716,629 A * | 12/1902 | Dodge | ............ | 434/164 |
| 1,061,913 A * | 5/1913 | Hughes | ............ | 434/164 |
| 3,384,964 A | 5/1968 | Phillips | | |
| 3,667,139 A * | 6/1972 | Barr | ............ | 434/113 |
| 4,259,784 A * | 4/1981 | MacPherson | ............ | 33/1 K |
| 4,343,848 A * | 8/1982 | Leonard, Jr. | ............ | 428/156 |
| 4,451,519 A * | 5/1984 | Irrgeher | ............ | 428/167 |
| 4,669,986 A * | 6/1987 | Yokoyama | ............ | 434/164 |
| 7,118,135 B2 | 10/2006 | Tims et al. | | |
| 7,287,339 B2 * | 10/2007 | Robertson | ............ | 33/562 |
| 2002/0009695 A1 * | 1/2002 | Rasheed et al. | ............ | 434/85 |
| 2008/0070200 A1 | 3/2008 | Hachey | | |
| 2008/0241802 A1 | 10/2008 | Hachey | | |

* cited by examiner

*Primary Examiner* — Kurt Fernstrom
(74) *Attorney, Agent, or Firm* — Fish & Associates, PC

(57) ABSTRACT

An improved sketching device is disclosed having a substantially flat base and a regular grid of at least 20×20 bumps disposed on the base. A bottom of the each of the bumps can be spaced apart from a bottom of an adjacent bump by a first distance comprising between 0.005-5 mm. The raised bumps can be sized and positioned to form a plurality of intersecting grooves.

13 Claims, 4 Drawing Sheets

SKETCHING DEVICES HAVING IMPROVED GEOMETRY

FIELD OF THE INVENTION

The field of the invention is sketching devices.

BACKGROUND

Traditionally, accurately drawing straight or curved lines required the use of rulers, compasses, protractors, and/or other guides. U.S. Pat. No. 3,384,964 to Phillips and U.S. Pat. No. 4,451,519 to Irrgeher describe guides having a plurality of grooves with rounded junctures, such that when the guide is placed beneath a paper sheet, the grooves guide a marking instrument to draw a line. Phillips, Irrgeher, and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

U.S. Patent Appl. No. 2008/0241802 to Hachey, et al. (publ. October 2008) describes a clipboard having grooves that can be rotated as desired to guide a user in drawing angled lines. U.S. Patent Appl. No. 2008/0070200 to Hachey, et al. (publ. March 2008) describes sketch paper having grooves that embossed onto the writing paper.

Such grooved devices can be useful to draw lines, but can often fail to keep a marking instrument within the desired groove. This results in crooked or otherwise imperfect lines, and thus limits the usefulness of the guide. Although increasing the height of the raised portions can increase the likelihood that a marking instrument remains within the desired groove, larger raised portions will typically deform paper, causing dimples and other surface aberrations. Paper deformations can be avoided reducing the size of the raised portions, but this also reduces the ability of the raised portions to keep the marking instrument within the desired groove.

It is also known to utilize raised portions to teach children how to write. See, e.g., U.S. Pat. No. 7,118,135 to Tims and U.S. Pat. No. 4,669,986. However, such devices have limited use.

Thus, there is still a need for a sketching device having an improved geometry such that a marking instrument is retained within a desired groove while preventing unwanted paper deformations.

SUMMARY OF THE INVENTION

The inventive subject matter provides apparatus, systems and methods in which an improved sketching device includes a substantially flat base, and a grid of bumps disposed on the base that are sized and positioned to form a plurality of intersecting grooves intersecting at right angles, or at non-right angles. The sketching device can be used for guiding a user in drawing a trace. As used herein, the term "substantially flat base" means a base that does not deviate from a horizontal plane by more than five degrees. As used herein, the phrase "bumps disposed on the base" means that the bumps are connected to a surface of the base, and therefore includes devices in which the base has one or more coatings between the base and the bumps.

As used herein, the term "trace" includes both straight and curved lines. As further used herein, the term "groove" is defined as the spacing between two adjacent bumps, which includes the space of the downward sloping sides of the bumps, if any. Thus, the groove width generally varies along a height of a bump.

Preferred groove widths are configured to provide sufficient width to accommodate typical sizes of pens, pencils, or other marking instruments. However, the groove widths can vary as needed to accommodate specific sizes of pencils, pens, highlighters, art supplies, and other marking instruments. Thus, for example, a sketching device to be used with a pen could have a different groove width than a sketching device to be used with a large marker. Those skilled in the art will appreciate that even in regularly spaced bumps, there is a maximum groove width (between adjacent bump tops) and a minimum groove width (between adjacent bump bottoms).

In use, the bumps and grooves of the sketching device act as a tactile guide to ensure that a marking instrument travels along the desired groove with very limited, and preferably, no deviation.

Preferred bumps are spaced apart such that a bottom of the each of the bumps is spaced apart from a bottom of an adjacent bump by a first distance, which can be between 0.005-5 mm, more preferably between 0.01-4 mm, between 0.05-3 mm and most preferably, between 0.1-2 mm. As used herein, the term "adjacent" means next to, whether or not two items are separated. However, items that are separated by more than 10 mm are not considered to be adjacent as defined herein. As used herein, the term "side" means a section connecting a top to a bottom. The top may be an apex point or a planar surface, and the bottom may be the base.

The spacing between adjacent bumps advantageously allows the sketching device to more effectively retain a marking instrument within an intended groove, rather than have the marking instrument stray in an unintended direction. In addition, the spacing between adjacent bumps allows the sketching device to retain a marking instrument within a desired groove even when used with duplicate or triplicate paper. In this manner, the sketching device can advantageously be used with truck driver and other forms such as those described in U.S. utility application having Ser. No. 12/760,852 filed on Apr. 15, 2010, or be included in a kit such as described in U.S. utility application having Ser. No. 12/490,123 filed on Jun. 23, 2009.

In some contemplated embodiments, the bumps can be disposed on the base to form a grid having at least 20×20 bumps, and more preferably at least 40, 60, and most preferably, at least 100 bumps along the length and width of the base. The number of bumps along each of the length and width of the base can vary depending on the bump size and dimension, the spacing between bumps, the size of the base, the marking instrument to be used, and so forth.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The bumps may form one or more patterns, including, for example, orthogonal grids, isometric or other angled grids, rays, circles, ovals, and/or any combinations thereof. Preferably, the patterns are discernible using at least one of Cartesian coordinates, Polar coordinates, and/or logarithmic coordinates. As used herein, the term "pattern" is defined as an array of bumps positioned with some discernable regularity, whether simple or complex.

In some contemplated embodiments, the arrangement of bumps could be disposed on a whiteboard, a drafting table, or other drawing surface to assist a user in drawing a trace.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
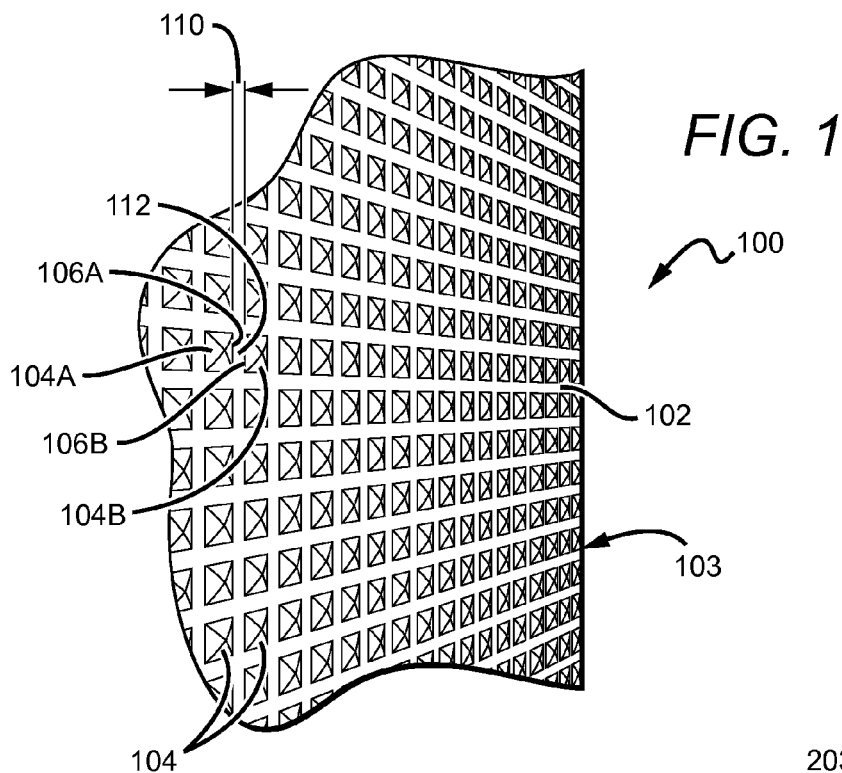
FIG. 1 is a perspective view of an embodiment of a sketching device.

In FIG. 1, a sketching device 100 is shown having a substantially flat base 102, and a plurality of bumps 104 disposed on the base 102. Currently preferred bumps 104 have a pyramidal shape, although the bumps 104 alternatively can have any commercially suitable shape including, for example, rounded and square.

Preferably, the plurality of bumps 104 are arranged in a grid 103 of at least 20×20 bumps, although other commercially suitable arrangements are contemplated. The grid 103 could be regular or irregular, and preferably is a Cartesian or close-packed grid. In this manner, the bumps 104 can form a plurality of intersecting grooves 112. It is contemplated that the number of bumps 104 of the grid 103 will vary, and could depend on the size and dimension of the sketching device 100, the size of the bumps 104, and so forth. Some contemplated sketching devices 100 could have at least 20×40, 40×40, 60×60, 80×80, or even 100×100 bumps 104, and the number of bumps 104 along each direction could differ. Although preferred sketching devices 100 include between 30-120 bumps 104 per square inch, the number of bumps 104 will vary based upon the desired pattern and marking instrument to be used.

Unlike prior art devices such as U.S. Pat. No. 3,384,964 to Phillips and U.S. Pat. No. 4,451,519 to Irrgeher, where the bottoms of adjacent bumps are juxtaposed, the bottoms of the bumps 104 of the present sketching device 100 are spaced apart, and disposed on the base 102 such that a bottom 106A of a first bump 104A is separated from a bottom 106B of an adjacent bump 104B by a first distance 110. The distance 110 between adjacent bumps 104A and 104B allows the sketching device 100 to more accurately guide a marking instrument along a groove 112. The first distance 110 preferably is between 0.005-5 mm, more preferably, between 0.01-4 mm, between 0.05-3 mm and most preferably, between 0.1-2 mm. It is further contemplated that the distance 110 between bumps 104 can be varied such that the sketching device 100 can have grooves of two or more widths. In this instance, and where other upper limits are not expressly stated, the reader should infer a reasonable upper limit. In this instance, for example, a commercially reasonable upper limit is about 10.

In prior art devices, a user's marking instrument easily strayed from a groove between adjacent bumps. Such straying would only become worse if greater weight paper were used. To overcome this disadvantage, the past solution was to increase the height of the bumps. However, this produced another disadvantage in that the taller the bumps, the greater the likelihood of paper deformations.

In experimenting with spaced apart bumps, the present inventor was surprised to discover that the spacing enabled the sketching device to significantly reduce undesirable straying of a marking instrument from an intended groove, even if higher weight paper or duplicate or triplicate forms were used. The spacing between bumps allows a marking instrument to press the paper closer to the base, and thus, a greater portion of adjacent bumps can be used to guide a marking instrument.

Such spacing advantageously allows the sketching device 100 to accurately guide a marking instrument along a groove 112 while significantly reducing inadvertent deviation from the groove 112 that can often occur with prior art devices such as that described in U.S. Pat. No. 3,384,964 to Phillips and U.S. Pat. No. 4,451,519 to Irrgeher. In addition, the sketching device 100 does not require enlargement of the bumps which eliminates unwanted paper deformation associated with increasing the bumps size.

It is currently preferred that each of the bumps 104 are of the same size and dimension. Of course, although less preferred, unequally sized bumps could also be used.

The tops of the bumps 104 are preferably rounded, but could alternatively have substantially flat tops, either slanted or parallel to the plane of the base, to reduce the likelihood of the bumps leaving an impression on the paper sheet. In other embodiments, the bumps can have a pointed top or other commercially suitable shape.

As shown in FIG. 1, the grooves 112 can intersect at right angles. However, in other contemplated embodiments, the grooves 112 could intersect at non-right angles including, for example, if the grid was in a close-pack configuration.

Figure 2:
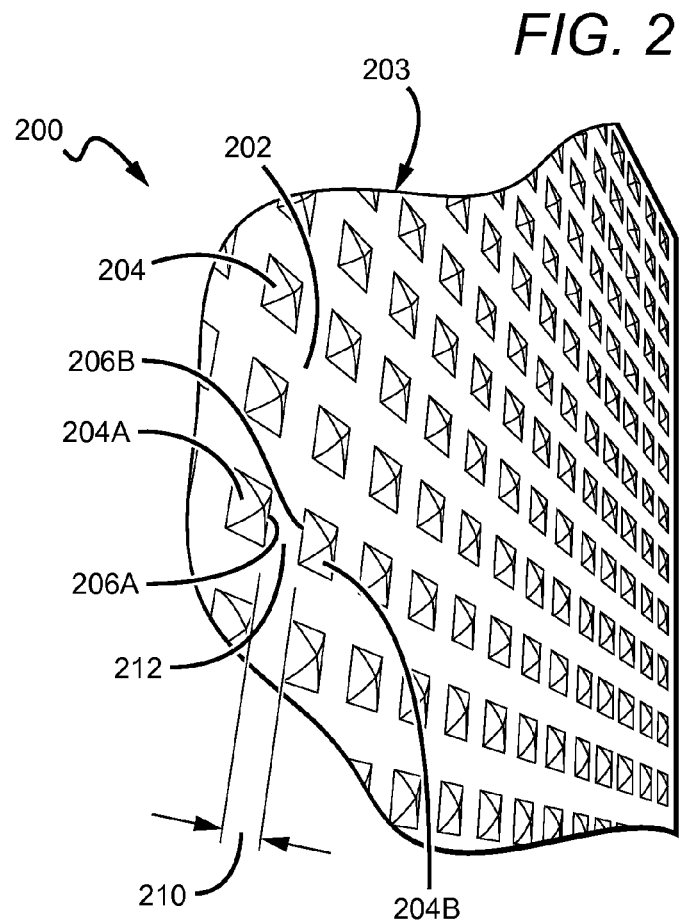
FIG. 2 is a perspective view of another embodiment of a sketching device.

FIG. 2 illustrates another embodiment of a sketching device having a greater distance 110 between adjacent bumps 204. With respect to the remaining numerals in FIG. 2, the same considerations for like components with like numerals of FIG. 1 apply.

Figure 3:
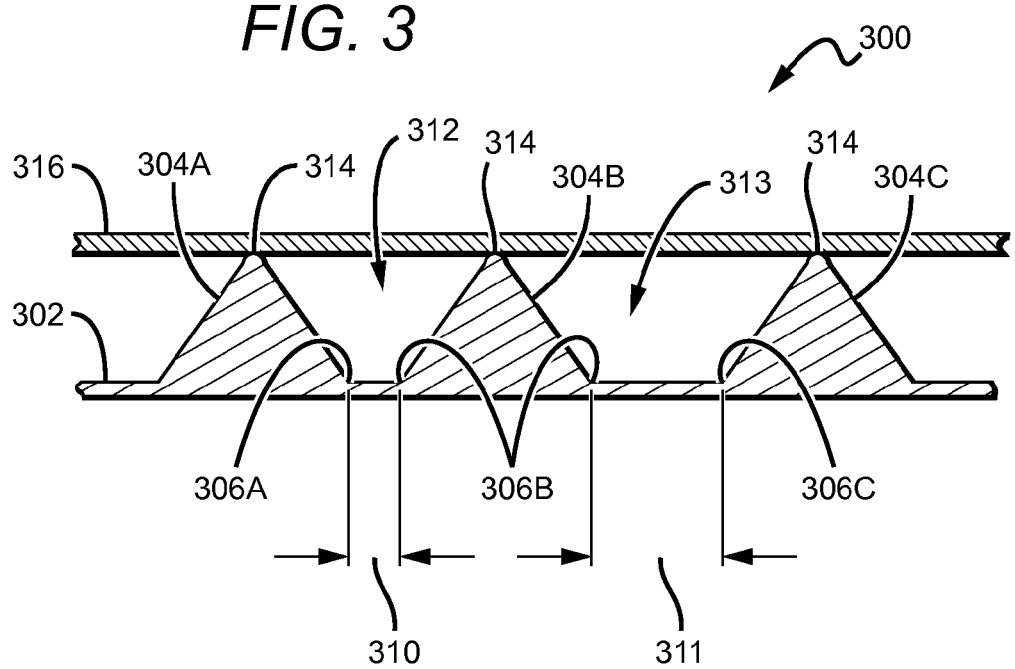
FIGS. 3-6 are cross-sectional views of additional embodiments of a sketching device.

In FIG. 3, a cross-section of an embodiment of a sketching device 300 is shown having bumps 304A, 304B, and 304C disposed on a base 302 that form grooves 312 and 313. A piece of paper 316 can be laid across the bumps 304A, 304B, and 304C such that a marking instrument can follow along one of grooves 312 and 313 to draw a line or other trace.

The bumps 304A, 304B, and 304C are spaced apart such that the sketching device is better able to guide a marking instrument along one of grooves 312 and 313. A bottom 306A of bump 304A is spaced apart from a bottom 306B of bump 304B by a first distance 310. The bottom 306B of bump 304B is spaced apart from a bottom 306C of bump 304C by a second distance 311 that is greater than the first distance 310. This varying-width spacing can allow the sketching device 300 to accommodate more than one size marking instrument, or varied paper thickness.

Figure 4:
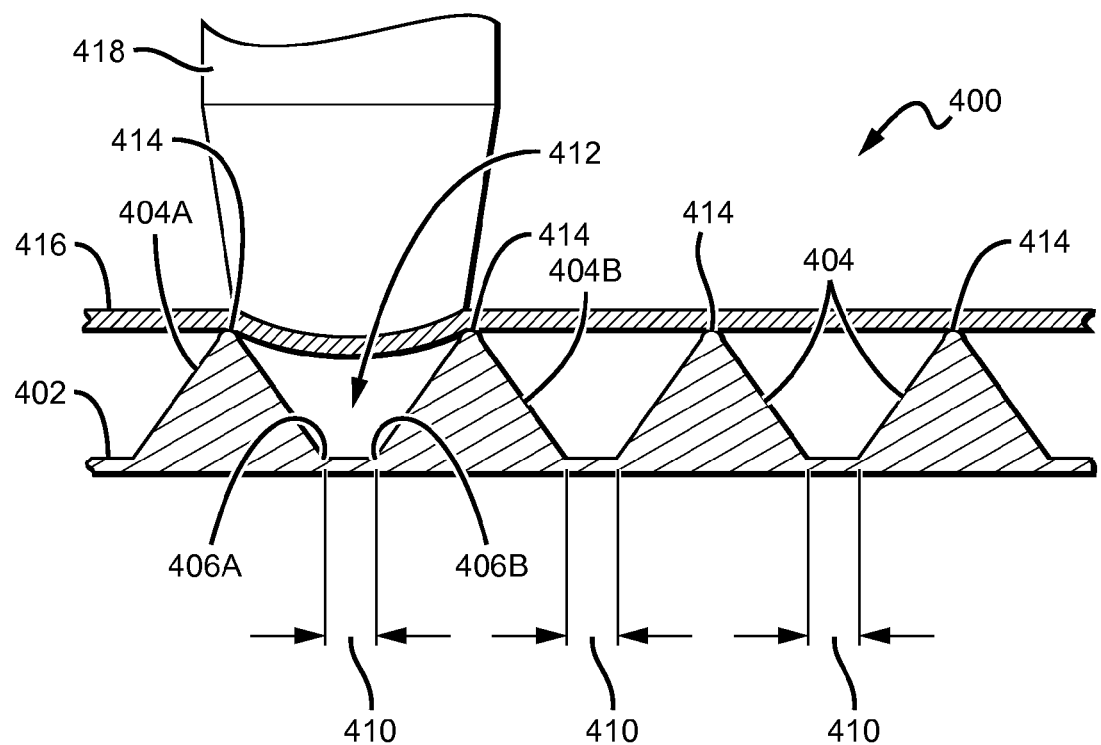

FIG. 4 illustrates a cross-section of another embodiment of a sketching device 400 having bumps 404, 404A, and 404B that are equally spaced apart. In this manner, a bottom of bump 404A is spaced apart from a bottom of adjacent bump 404B by a first distance 410. As shown in FIG. 4, the sketching device 400 can be used to guide a marking instrument 418 along a groove 412 to assist a user in drawing a line or other trace. As the marking instrument 418 is pressed against the paper 416, the paper 416 is depressed within the groove 412, which thereby allows the sketching device 400 to guide the marking instrument 418. By spacing apart the bumps 404, 404A, and 404B, the paper can be further depressed within the groove 412 and the marking instrument can be placed between, and thereby interact with, a greater portion of adjacent bumps 404A and 404B that act to guide the marking instrument along groove 412.

Figure 5:
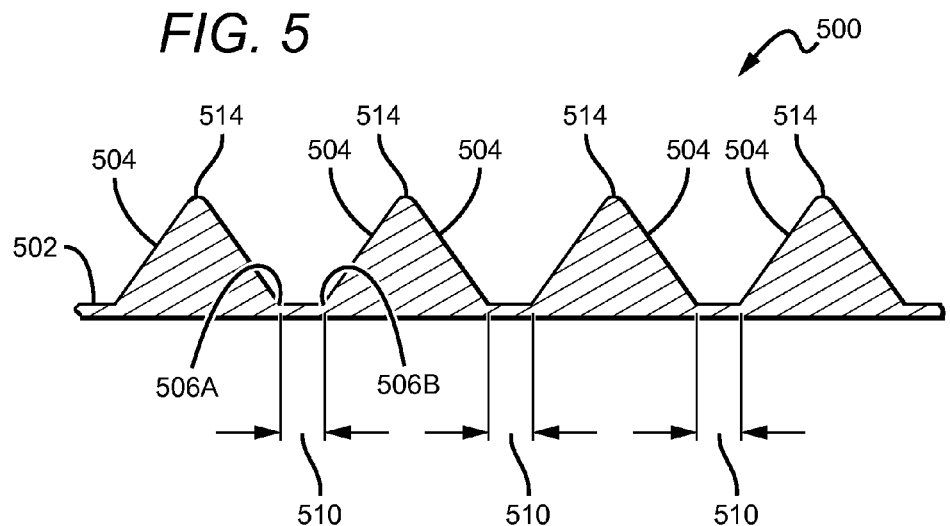
Figure 6:
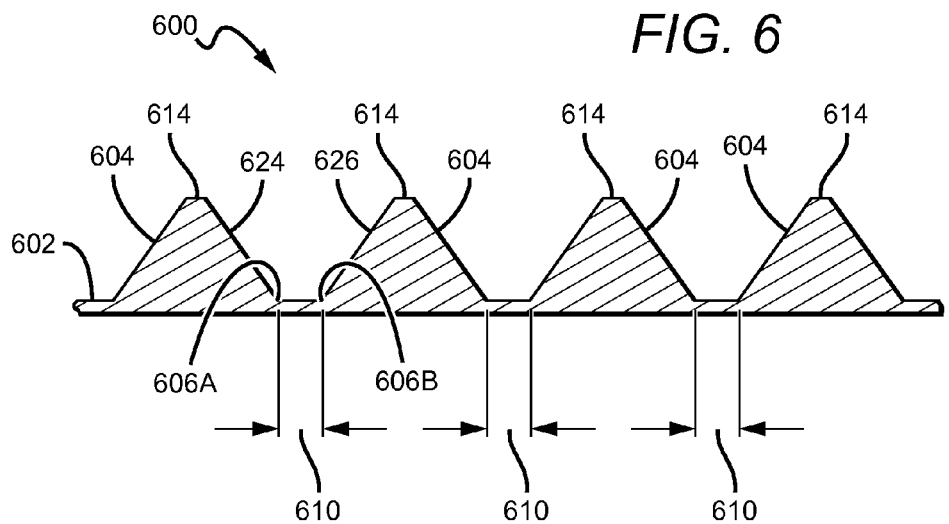

FIGS. 5-6 illustrates two additional embodiments of a sketching device 500 and 600 having bumps 504 and 604 with a rounded top 514 and flat top 614, respectively. As shown in FIG. 6, one preferred device includes a side 624 of bump 604, the first distance 610, and a side 626 of adjacent bump 604 define three sides of a trapezoid. With respect to the remaining numerals in each of FIGS. 5-6, the same considerations for like components with like numerals of FIG. 1 apply.

Figure 7A:
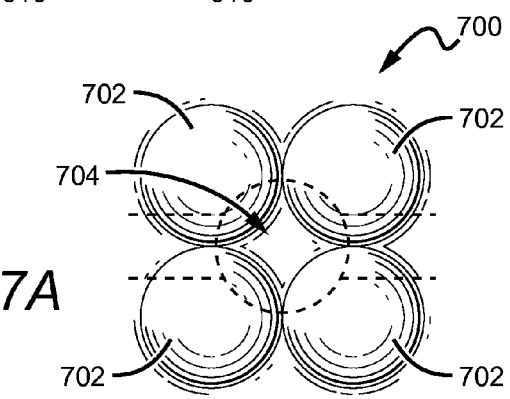
FIG. 7A is a top view of a prior art device
Figure 7B:
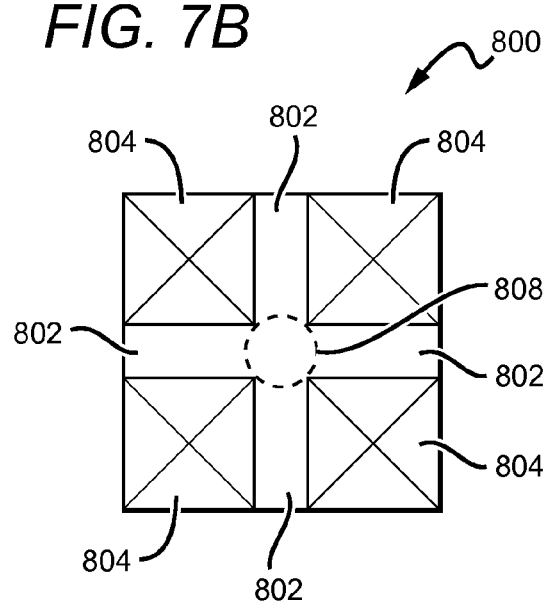
FIG. 7B is a top view of one embodiment of a sketching device.

FIG. 7A illustrates a top view of a prior art device 700 that lacks any spacing between adjacent bumps 702. As can be seen, a large deviation area 704 exists in the middle of a 2×2 section of bumps 702 which can often lead to deviation of a marking instrument from an intended path. FIG. 7B illustrates a top view of one embodiment of an improved sketching device 800 having a spacing 802 between adjacent pyramid-shaped bumps 804, which allows a marking instrument to more accurately follow a groove 806 and reduces the size of a deviation area 808 to thereby reduce unintentional deviation from an intended path.

Figure 8:
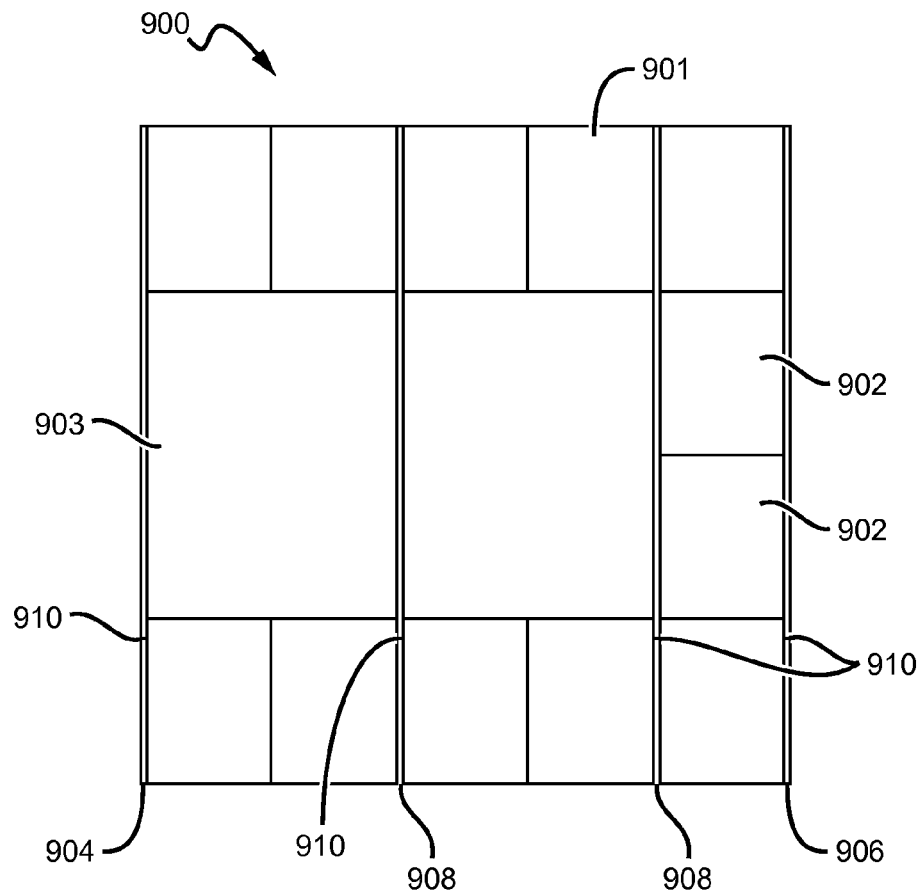
FIG. 8 is a top view of a roll sheet.

In FIG. 8, a roll sheet 900 is shown that has a plurality of sketching devices 901-903 of different sizes and configurations. The roll sheet 900 includes two leading edges 904 and 906 that each lacks bumps to provide a smooth surface. This advantageously allows the sheet 900 to be fed automatically into a printer or other device. A preferred printer is the HP™ Indigo™ digital printing press. In addition, the sheet 900 includes at least one, and preferably two, tracks 908 that lack any bumps to thereby provide a smooth surface onto which a suction cup or similar device can be applied to lift the sheet 900. The tracks 908 and smooth leading edges 904 and 906 preferably comprise one-half inch in width, although the widths could be varied depending on the application. Various raised markers 910 could be placed on the sheet 900 to assist a printer or other device in determining whether or not the sheet 900 is properly aligned before printing. Each of the markers preferably comprises a width of 1/16 inch, although the widths could be varied depending on the application.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly reference d. Where the specification claims refers to at least one of something selected from the group consisting of A, B, C . . . and N, the text should be interpreted as requiring only one element from the group, not A plus N, or B plus N, etc.

What is claimed is:

1. An improved sketching device, comprising:
   a substantially flat base; and
   a regular grid of at least L×W bumps disposed on the base, wherein L is at least 20 and W is at least 20, such that a bottom of each bump is spaced apart from a bottom of an adjacent bump by a first distance comprising at least 0.005 mm and no more than 5 mm; and
   wherein the raised bumps are sized and positioned to form a plurality of intersecting grooves that act as tactile guides for use with drawing a trace on a paper with a marking instrument.

2. The sketching device of claim 1, wherein the bumps have a pyramid-shape.

3. The sketching device of claim 1, wherein the bumps each have a rounded top.

4. The sketching device of claim 1, wherein the bumps each have a substantially flat top.

5. The sketching device of claim 1, wherein a bottom of at least one of the bumps is spaced apart from a bottom of an adjacent bump by a second distance which is greater than the first distance.

6. The sketching device of claim 1, wherein the first distance comprises at least 0.01 mm and no more than 4 mm.

7. The sketching device of claim 1, wherein the first distance comprises at least 0.05 mm and no more than 3 mm.

8. The sketching device of claim 1, wherein the first distance comprises at least 0.1 mm and no more than 2 mm.

9. The sketching device of claim 1, wherein L is at least 40 and W is at least 40.

10. The sketching device of claim 1, wherein L is at least 60 and W is at least 60.

11. The sketching device of claim 1, wherein L is at least 100 and W is at least 100.

12. The sketching device of claim 1, wherein the grooves intersect at a right angle.

13. The sketching device of claim 1, wherein the grooves intersect at a non-right angle.

\* \* \* \* \*